(12) United States Patent  
Pionetti

(10) Patent No.: US 10,197,195 B2  
(45) Date of Patent: Feb. 5, 2019

(54) ANTI-SLIDE DEVICE FOR THE SELF-CENTERING OF AN INNER TUBE INSIDE AN OUTER TUBE OF AN ELEMENT OF UNIT LENGTH OF A SUBSEA PIPELINE FOR TRANSPORTING FLUIDS

(71) Applicant: SAIPEM S.A., Montigny le Bretonneux (FR)

(72) Inventor: François-Régis Pionetti, La Baleine (FR)

(73) Assignee: Saipem S.A., Montigny le Bretonneux (FR)

( * ) Notice: Subject to any disclaimer, the term of this patent is extended or adjusted under 35 U.S.C. 154(b) by 0 days.

(21) Appl. No.: 15/550,613

(22) PCT Filed: Feb. 5, 2016

(86) PCT No.: PCT/FR2016/050252  
§ 371 (c)(1),  
(2) Date: Aug. 11, 2017

(87) PCT Pub. No.: WO2016/128655  
PCT Pub. Date: Aug. 18, 2016

(65) Prior Publication Data  
US 2018/0038520 A1   Feb. 8, 2018

(30) Foreign Application Priority Data  
Feb. 11, 2015   (FR) ...................................... 15 51106

(51) Int. Cl.  
*F16L 9/18*   (2006.01)  
*F16L 21/04*   (2006.01)  
*F16L 7/02*   (2006.01)  
*F16L 59/20*   (2006.01)  
(Continued)

(52) U.S. Cl.  
CPC .................... *F16L 7/02* (2013.01); *F16L 1/19* (2013.01); *F16L 1/20* (2013.01); *F16L 59/20* (2013.01); *F16L 9/18* (2013.01); *F16L 21/04* (2013.01)

(58) Field of Classification Search  
CPC ................ F16L 7/02; F16L 9/18; F16L 21/04  
USPC ............ 138/112–114, 108, 148; 285/123.15, 285/123.3  
See application file for complete search history.

(56) References Cited

U.S. PATENT DOCUMENTS 2,258,135 A * 10/1941 Curtis ................... F16L 21/045  
  220/235  
3,406,748 A * 10/1968 Jarreby ................... B41F 13/22  
  138/114  
(Continued)

FOREIGN PATENT DOCUMENTS

GB   2 317 934   4/1998  
GB   2 318 400   4/1998

*Primary Examiner* — Patrick F Brinson  
(74) *Attorney, Agent, or Firm* — Cozen O'Connor

(57) ABSTRACT

An anti-slip and self-centering device for an inner tube inside an outer tube of a unit length element for an undersea fluid transport pipe, the device having a ring (4) made of elastomer material sandwiched between two annular metal plates (6, 8) having an inside diameter that corresponds substantially to the diameter of the inner tube and an outside diameter that corresponds substantially to the diameter of the outer tube, the device further having a clamp (10, 12) for clamping the plates together to compress the ring.

9 Claims, 2 Drawing Sheets

(51) Int. Cl.
*F16L 1/19* (2006.01)
*F16L 1/20* (2006.01)

(56) References Cited

U.S. PATENT DOCUMENTS

| | | | | | |
|---|---|---|---|---|---|
| 3,964,754 | A | * | 6/1976 | Murai | F16L 7/02 |
| | | | | | 277/621 |
| 4,124,040 | A | * | 11/1978 | Miller | F16L 3/00 |
| | | | | | 138/109 |
| 4,699,405 | A | * | 10/1987 | Miller | F16L 21/045 |
| | | | | | 285/232 |
| 4,753,461 | A | * | 6/1988 | Miller | F16L 21/045 |
| | | | | | 285/338 |
| 4,984,830 | A | * | 1/1991 | Saunders | E21B 33/038 |
| | | | | | 285/334.2 |
| 5,860,453 | A | * | 1/1999 | Picking | F16L 7/02 |
| | | | | | 138/108 |
| 6,305,429 | B1 | * | 10/2001 | Welch | F16L 7/02 |
| | | | | | 138/112 |
| 6,394,140 | B1 | * | 5/2002 | Peacock | F16J 15/121 |
| | | | | | 138/108 |
| 7,225,837 | B1 | * | 6/2007 | Kane | F16L 7/00 |
| | | | | | 138/108 |
| 8,291,940 | B2 | * | 10/2012 | Frohne | F16L 7/00 |
| | | | | | 138/112 |
| 2003/0075226 | A1 | * | 4/2003 | Codling | F16L 7/02 |
| | | | | | 138/113 |

* cited by examiner

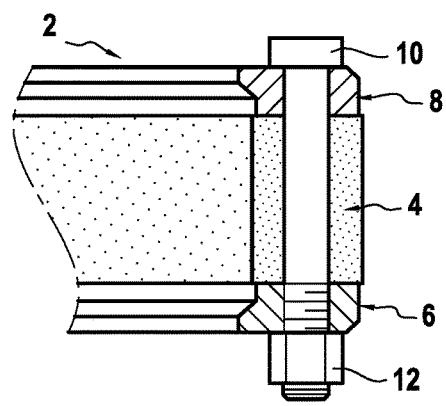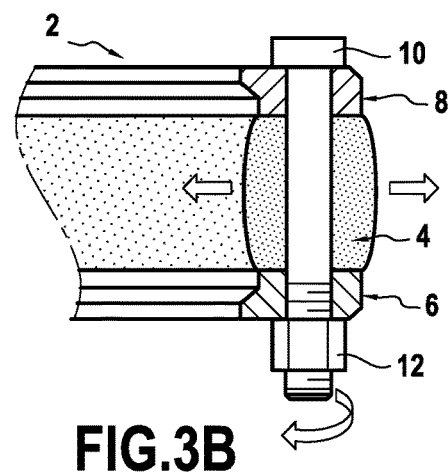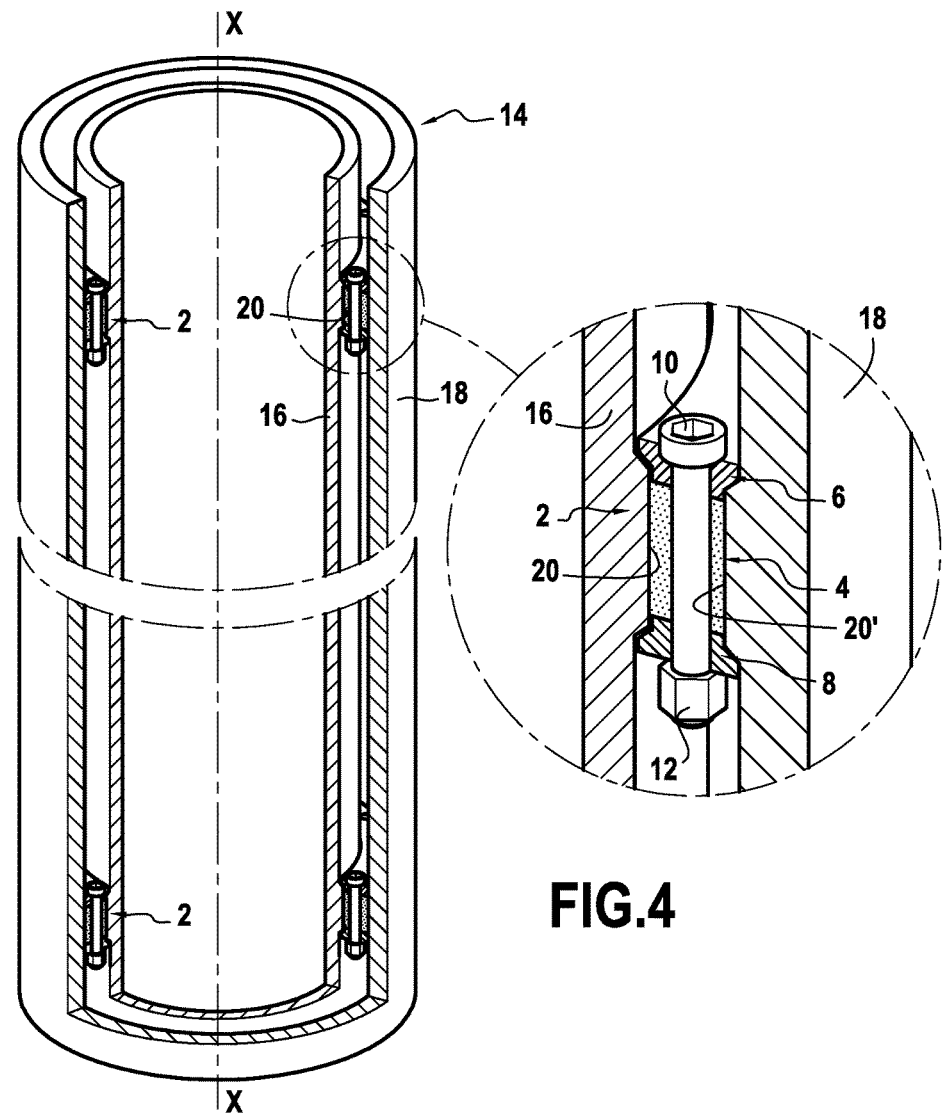

ANTI-SLIDE DEVICE FOR THE SELF-CENTERING OF AN INNER TUBE INSIDE AN OUTER TUBE OF AN ELEMENT OF UNIT LENGTH OF A SUBSEA PIPELINE FOR TRANSPORTING FLUIDS

PRIORITY CLAIM

This is a U.S. national stage of application No. PCT/FR2016/050252, filed on Feb. 5, 2016. Priority is claimed on France Application No. FR1551106, filed Feb. 11, 2015, the content of which is incorporated here by reference.

BACKGROUND OF THE INVENTION

The present invention relates to the general field of undersea pipes resting on the sea bottom or providing a bottom-to-surface connection for transferring hydrocarbons, in particular oil and gas, coming from undersea production wells.

The invention relates more precisely to coaxial undersea pipes of the pipe in pipe (PIP) type, where an inner tube transports the fluid and an outer tube coaxial around the inner tube, and also referred to as the "outer envelope", is in contact with the surrounding medium, i.e. water. The annular space between the two tubes can be filled with an insulating material or it may be evacuated of any gas in such a manner as to provide thermal insulation for the fluids flowing in the inner tube. Such coaxial undersea pipes are used particularly for installations at great depths where the water temperature is typically 4° C.

In general, these coaxial pipes are assembled on land to constitute elements of unit length (known as double, triple, or quadruple joints, and referred to below as "quad-joints" for quadruple sections of tube), having length of the order of 10 meters (m) to 100 m depending on the loading capacity of the laying system. Such strings of pipes are thus transported to sea on a laying vessel.

During laying, the quad-joints are connected to one another on board the vessel while they are being laid at sea. Laying may be performed via a J-lay tower positioned on the laying vessel. With J-laying, the undersea pipe is typically lowered from the laying vessel practically vertically (at an angle in the range +30° to −10° relative to the vertical). J-laying comprises single-catenary laying in which the quasi-vertical angle of inclination of the pipe diminishes progressively on going down towards the bottom where it matches the slope of the sea bottom.

The J-laying method makes it necessary to move each quad-joint from a horizontal position (along the deck of the laying vessel) to a vertical position in order to align it with the J-lay tower. The quad-joint is held vertically by the laying tower in order to enable its bottom end to be welded to the top end of the pipe. Once the quad-joint has been welded to the pipe, the quad-joint is lowered into the sea while moving the laying vessel forwards by an amount corresponding to the length of the quad-joint.

Applied to coaxial PIP type pipes, the J-laying method makes provision for the quad-joint to be welded vertically to the undersea pipe already in place. The new quad-joint is presented offset upwards between the outer tube and the inner tube in order to enable the inner tube to be welded to that of the undersea pipe waiting in the J-lay tower holding device, then to slide the outer tube of the quad-joint relative to the inner tube downwards so as to weld its bottom end to the corresponding free end of the outer tube of the undersea pipe. Said pipe is then lowered into the sea and the operation is repeated with a new quad-joint.

In practice, such a laying method presents a certain number of problems. In particular, during hoisting of the new quad-joint, the inner tube must be held in position to prevent it slipping freely. Until now, complex special devices have been placed at the end to reinforce such holding, prior to being removed after the inner tube has been welded to the undersea pipe. However, using such devices is costly in terms of laying time. In addition, during laying of the inner tube of the quad-joint on the inner tube of the undersea pipe waiting vertically in the J-lay tower, the inner tube, if it is free, tends to deform helically in the outer tube of the undersea pipe, in such a manner that it is then generally necessary to adjust the top portion of the pipe in order to take up the clearance (the inner tube is cut as much as necessary). Finally, the step of sliding the outer tube relative to the inner tube risks leading to certain parts positioned around the inner tube of the quad-joint being pulled off (such as thermal insulation, heating cables, optical fibers, centering spacers, etc.).

OBJECT AND SUMMARY OF THE INVENTION

A main object of the present invention is thus to provide an anti-slip and self-centering device for an inner tube inside an outer tube and that does not present the above-mentioned drawbacks.

In accordance with the invention, this object is achieved by means of an anti-slip and self-centering device for an inner tube inside an outer tube of a unit length element for an undersea fluid transport pipe, the device comprising a ring made of elastomer material sandwiched between two annular metal plates having an inside diameter that corresponds substantially to the diameter of the inner tube and an outside diameter that corresponds substantially to the diameter of the outer tube, the device further comprising clamping means for clamping the plates together in order to compress the ring made of elastomer material.

By compressing the ring made of elastomer material by clamping the plates together, the device of the invention serves in particular to ensure that the tubes are coaxial and that the inner tube is held vertically inside the outer tube of the unit length pipe element (or quad-joint). The device is applied to a shoulder of the inner tube with the plates for compressing the elastomer positioned on either side of the shoulder in such a manner that the plates are blocked by the shoulder. The device is thus totally stationary relative to the inner tube, in such a manner that the slipping needed for assembling the undersea pipe is forced and controlled and can only be done on the inside surface of the outer tube.

In addition, the clamping force is applied on the plates of the device so as to ensure a strong anti-slip stress between the inner and outer tubes. The characteristics of the device of the invention and the clamping force are calibrated as a function of the weight of the inner tube so as to prevent any slipping of the inner tube under the effect of its own weight, while allowing controlled slipping for values that are 15% to 50% greater than the weight (the load factor is defined when designing the device as a function of the characteristics of the loading arms of the J-lay tower, of the tubes constituting the undersea pipe, and of their accessories).

More precisely, the load factor of the device must be selected so as to avoid untimely (i.e. uncontrolled) slipping of the inner tube relative to the outer tube while it is being positioned vertically in the J-lay tower (and thus guarantee the safety of operators). The load factor must also prevent relative movement of the two tubes during laying in the catenary portion of the undersea pipe (maintaining a constant length between the tubes). The load factor must also avoid crushing or diminishing the ring of the undersea pipe when pipe length varies due to variations in temperature.

It should be observed that the slipping of the two tubes relative to each other when a quad-joint is added is forced slipping and is completely controlled by the loading arms of the J-lay tower. By being capable of taking up the (vertical) weight of a quad-joint, these loading arms are capable of applying vertically downward forces that are three or four times greater, in particular for forcing alignment of the tubes and ensuring welding without opening the sections to be welded.

The device of the invention also makes it possible to hold the inner tube coaxially inside the outer tube of the unit length element. The clearance between the inner tube and the outer tube thus remains constant during the entire operation of assembling the unit length pipe element on the undersea pipe.

Finally, the device of the invention makes it possible to ensure parts, and in particular heating cables, optical fibers, etc., are blocked in position around the inner tube of the unit length pipe element. In this way, the device of the invention makes it possible to avoid any of the parts being pulled off during the stage of the outer tube sliding relative to the inner tube.

The clamping means may comprise a plurality of screws that pass through the two plates and the ring made of elastomer material, and that are suitable for being tightened in nuts. In this event, the screws preferably each have a tensile grade of 12.9.

Preferably, at least one of the two plates is made from at least two angular plate sectors. This characteristic has the advantage of facilitating assembly of the device around the shoulder of the inner tube.

Also preferably, the ring of the device is made of ethylene propylene diene monomer (EPDM) having a Shore hardness lying in the range 30 to 90, a Young's modulus of less than 1 megapascal (MPa), and a Poisson's ratio of the order of 0.5. The plates of the device may be made of steel.

The invention also provides a unit length element for an undersea fluid transport pipe, the element comprising an inner tube, an outer tube mounted coaxially around the inner tube, and at least one anti-slip and self-centering device that is interposed between the inner tube and the outer tube and disposed around an annular shoulder of the inner tube.

Preferably, such a device is interposed between the inner tube and the outer tube at each longitudinal end of said undersea unit length pipe element.

Also preferably, each device is assembled around an annular shoulder of the inner tube positioned facing the shoulder of the inner tube. In addition, each device advantageously blocks in position at least one heating cable and/or at least one optical fiber.

BRIEF DESCRIPTION OF THE DRAWINGS

Other characteristics and advantages of the present invention appear from the following description given with reference to the accompanying drawings which show an embodiment having no limiting character. In the figures:

FIGS. 3A and 3B are fragmentary section views of the device of FIGS. 1 and 2 in the non-compressed state and in the compressed state, respectively; and FIG. 4 is a view of a unit length undersea pipe element of the PIP type fitted with devices of the invention.

DETAILED DESCRIPTION OF THE INVENTION

The invention applies to any type of fluid transport pipe, and in particular to undersea coaxial pipes of the pipe in pipe (PIP) type, i.e. a pipe that comprises an inner tube for transporting hydrocarbons coming from production wells and an outer tube coaxial around the inner tube and also referred to as the "outer envelope", which is in direct contact with the surrounding water.

This type of undersea coaxial pipe is typically used in the offshore production of hydrocarbons at great depths. In the context of such installations, undersea coaxial pipes can be assembled on land as a plurality of pipe sections of unit length (also referred to as "joints", in particular "double joints" for two unit elements assembled together, "triple joints" for three unit elements assembled together, and "quadruple joints" for four unit elements assembled together, or more generically "quad-joint" for quadruple tube sections), of the order of 10 m to 100 m, depending on the loading capacity of the laying system. During laying, these unit length elements of undersea pipe are connected to one another on board the vessel progressively as they are laid in the sea.

In particular, the operation of connecting a unit length element to the undersea pipe that has already been lowered into the sea requires the unit length pipe element to be positioned vertically, and to be held in this position during welding of the bottom end of its inner tube to the top end of the inner tube of the undersea pipe, and then requires the outer tube to be slid in order to weld the top end of the outer tube of the undersea pipe.

The invention aims to provide an anti-slip self-centering device that serves, during the connection operation, to hold the inner tube of the unit length pipe element vertical and stationary inside the outer tube, while ensuring it is centered inside the outer tube.

Figure 1:
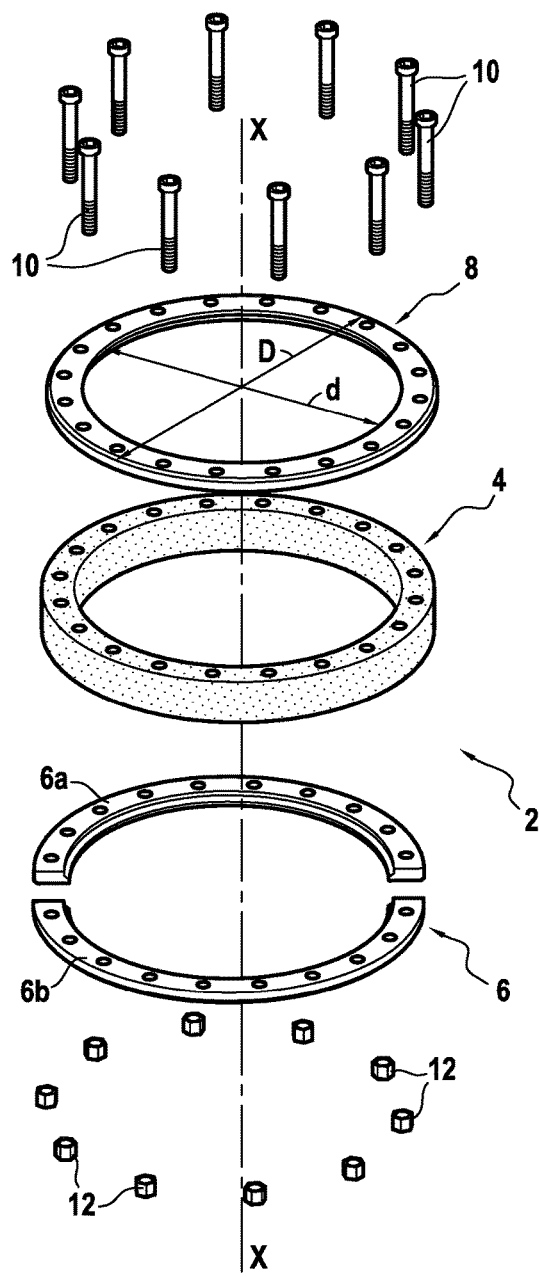
FIG. 1 is an exploded perspective view of the device according to an embodiment of the invention.
Figure 2:
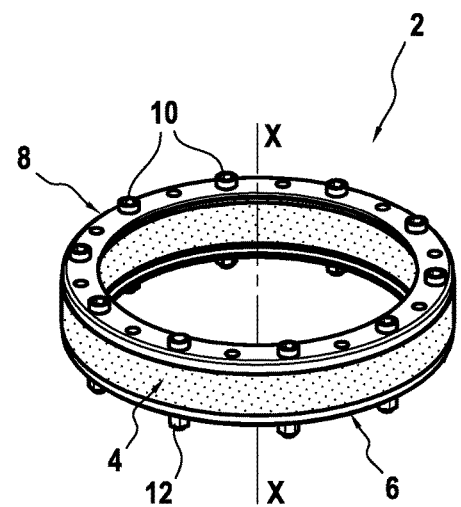
FIG. 2 is an assembled view of the device of FIG. 1.

An example of such a device 2 is shown in exploded perspective view in FIGS. 1 and 2.

The device 2 comprises in particular a ring 4 made of elastomer material, which is sandwiched between two annular plates 6, 8 made of metal (preferably steel) having an inside diameter d that corresponds substantially to the outside diameter of the inner tube of the unit length pipe element on which the device is designed to be assembled, and having an outside diameter D that corresponds substantially to the inside diameter of the outer tube of said unit length pipe element.

The device 2 further comprises clamping means for clamping plates 6, 8 together to compress the ring 4 made of elastomer material, the ring tending to "swell" radially towards both the inside and the outside of the plates under the compression force.

The clamping means may be made by means of a plurality of screws 10 passing through both of the plates 6, 8 and the ring 4 made of elastomer material and by clamping nuts 12. In the embodiment shown in FIG. 1, there are ten screws 10 that are regularly spaced apart about an axis of revolution X-X of the device.

FIG. 3A shows the device of FIGS. 1 and 2 in the assembled "rest" position, i.e. without compression of the ring 4 made of elastomer material, while FIG. 3B shows the same device after application of a clamping force by the nuts 12 on the screws 10 leading to compression of the ring 4, and thus to deformation of said ring that can be seen by a radial "expansion" both towards the inside and outside.

When the device is interposed between an inner tube and an outer tube of a unit length undersea pipe element, this compression of the ring of the device thus makes it possible to ensure that the inner tube is blocked in position inside the outer tube.

The elastomer material used for making the ring of the device, as well as the characteristics of the screws and nuts and of their clamping force, are selected and calibrated as a function of the requirements for blocking the inner tube of the undersea unit length pipe element inside the outer tube.

In particular, for the particular application envisaged (i.e. connecting a unit length element vertically to an undersea pipe), these selections and calibrations are defined to be able to support the weight of the inner tube but no more. In particular, the characteristics of the device must not prevent the outer tube from sliding relative to the inner tube once said inner tube is connected to the inner tube of the undersea pipe.

Thus, the characteristics of the device of the invention could be selected and calibrated so as to enable it to absorb a compression load lying in the range 1 MPa to 5 MPa (with an acceptable compression load of 3.5 MPa, the device can support up to 4.7 (metric) tonnes at the inner tube and up to 5.8 tonnes at the outer tube of the unit length pipe element, these values being given purely by way of indication and depending on the diameters and dimensions of the contact surfaces).

To this end, and by way of example, ethylene propylene diene monomer (EPDM) may be selected as the elastomer material for making the ring of the device having a Shore hardness lying in the range 30 to 90, a Young's modulus of less than 1 MPa, and a Poisson's ratio of the order of 0.5. Thus, with such a Poisson's ratio, the vertical pressure on the plates exerted by the clamping of the screws is almost equal to the contact pressure on the side walls of the tubes.

With such characteristics, the screws 10 used for clamping the plates 6, 8 may each have a tensile grade of 12.9 in order for their clamping to enable the plates to move closer together by about 0.5 mm.

FIG. 4 shows two devices 2 of the invention assembled together at each longitudinal end of an undersea pipe element 14 of unit length.

As described above, the pipe element 14 of unit length comprises an inner tube 16 disposed coaxially inside an outer tube 18.

At each of its longitudinal ends, the inner tube 18 is provided with an annular shoulder 20 where more precisely there is a device 2 of the invention. This shoulder 20 is thin (so as not to prevent the controlled slipping of the outer tube) and can be obtained by adding a small length of inner tube incorporated in the shoulder at both ends (it projects radially outwards).

Preferably, the outer tube 18 also comprises, on its inside surface, an annular shoulder 20' positioned facing the shoulder 20 of the inner tube in such a manner as to reinforce the safety of the device (the shoulder 20' projects radially inwards).

While the unit length pipe element is still in the horizontal position, the ring 4 made of elastomer material of the device is thus slid around an inner tube from one of its longitudinal ends in order to cover the corresponding shoulder 20.

The two annular plates 6, 8 are then positioned on each side of the ring 4, the plate situated on the side opposite the end of the inner tube (in this embodiment the plate 6) preferably being made from at least two angular plate sectors 6a, 6b (see FIG. 1) in such a manner as to facilitate its assembly around the inner tube.

The screws 10 and nuts 12 are thus mounted on the device (at this stage without tightening the nuts) with the screw heads advantageously turned towards the corresponding longitudinal end of the inner tube.

The outer tube 18 of the unit length pipe element is then slid longitudinally around the inner tube until it reaches the desired position. The screws 10 are thus clamped in the nuts 12 in such a manner as to compress the ring 4 made of elastomer material. As mentioned above, the clamping force is calibrated depending on the weight of the inner tube in order to enable the two devices to support the weight of the inner tube (with a safety margin of 15% to 20% more).

The annular space defined between the two devices 2 may be filled with an insulating material, in particular a resin. To this end, the devices of the invention may advantageously serve as a stop wall or mold during injection of the resin in order to hold said resin inside a fixed volume that is suitable for being evacuated.

The unit length pipe element 14 as assembled in this way can thus be mounted vertically by means that are known per se in order to be assembled to an undersea pipe that has already been lowered into the sea.

In advantageous manner, it should be observed that the device of the invention may be used to block various parts, such as heating cables, optical fibers, etc., in position around the inner tube of the unit length pipe element.

To this end, the heating cables, optical fibers, or others that extend longitudinally along the inner tube are interposed between the inner tube and the ring made of elastomer material of the device such that compression of said device ensures they are blocked in position.

The invention claimed is:

1. A unit length element for an undersea fluid transport pipe, the element comprising an inner tube, an outer tube mounted coaxially around the inner tube, and at least one anti-slip and self-centering device that is interposed between the inner tube and the outer tube and disposed around an annular shoulder of the inner tube, each anti-slip and self-centering device comprising a ring made of elastomer material sandwiched between two annular metal plates having an inside diameter (d) that corresponds substantially to the outside diameter of the inner tube and an outside diameter (D) that corresponds substantially to the inside diameter of the outer tube, and a clamp to force the plates together to compress the ring.

2. The unit length undersea pipe element according to claim 1, wherein the anti-slip and self-centering device is interposed between the inner tube and the outer tube at each longitudinal end of said unit length pipe element.

3. The unit length undersea pipe element according to claim 2, wherein the anti-slip and self-centering device is assembled around an annular shoulder of the outer tube positioned facing the shoulder of the inner tube.

4. The unit length undersea pipe element according to claim 1, wherein the anti-slip and self-centering device maintains in position at least one heating cable and/or at least one optical fiber.

5. The unit length undersea pipe element according to claim 1, wherein the clamp comprises a plurality of screws that pass through the two plates and the ring, and that are suitable for being tightened in nuts.

6. The unit length undersea pipe element according to claim 5, wherein the screws each have a tensile grade of 12.9.

7. The unit length undersea pipe element according to claim 1, wherein at least one of the two plates of the anti-slip and self-centering device is made from at least two angular plate sectors.

8. The unit length undersea pipe element according to claim 1, wherein the ring of the anti-slip and self-centering device is made of ethylene propylene diene monomer having a Shore hardness lying in the range 30 to 90, a Young's modulus of less than 1 MPa, and a Poisson's ratio of the order of 0.5.

9. The unit length undersea pipe element according to claim 1, wherein the plates of the anti-slip and self-centering device are made of steel.

* * * * *